United States Patent [19]

Richard

[11] 4,192,347
[45] Mar. 11, 1980

[54] HYDRAULIC COUPLER ASSEMBLY

[76] Inventor: Leroy J. Richard, 4567 Buena Vista Estates, Fargo, N. Dak. 58102

[21] Appl. No.: 881,002

[22] Filed: Feb. 24, 1978

[51] Int. Cl.² ............................................. F16L 37/22
[52] U.S. Cl. ............................ 137/614.06; 251/149.9
[58] Field of Search ................. 251/149.9; 137/614.05, 137/614.06, 614

[56] References Cited

U.S. PATENT DOCUMENTS

| | | | |
|---|---|---|---|
| 406,964 | 7/1889 | Stedman | 285/1 |
| 1,481,392 | 1/1924 | Schawrow | 285/88 |
| 1,639,813 | 8/1927 | Schawrow | 285/85 |
| 3,279,827 | 10/1966 | Brown | 285/1 |
| 3,301,272 | 1/1967 | Petty John et al. | 137/614.06 |
| 3,407,847 | 10/1968 | Snyder | 137/614.06 |
| 3,606,244 | 9/1971 | Nusbaum | 251/149.9 |
| 3,710,823 | 1/1973 | Vik | 137/614.06 |
| 3,809,122 | 5/1974 | Berg | 137/614.06 |
| 4,074,698 | 2/1978 | Hobson et al. | 137/614.06 |

OTHER PUBLICATIONS

Seymour Manf. Co., Seymour Ind., Hydraulic Coupler Assembly, Panther III Parts Book, Part No. 18-1608, Jul. 1976, p. 103.

*Primary Examiner*—Martin P. Schwadron
*Assistant Examiner*—A. Michael Chambers
*Attorney, Agent, or Firm*—Merchant, Gould, Smith, Edell, Welter & Schmidt

[57] ABSTRACT

An improved hydraulic coupler assembly of the type having a base plate which carries fixed and movable blocks. A spring biases the blocks away from one another with one end of the movable block received inside a bore of the fixed block. First and second nipple members are received inside the movable block with one of the nipple members being slidable therein. The other nipple member is releasably locked in the movable block by a plurality of locking balls engaged by a locking rib on the fixed block. A pivot lever member operates on both the slidably mounted nipple member and the movable block to first move the nipple members apart to stop the hydraulic flow therethrough and to then move the movable block towards the fixed block against the force of the spring to unlock the locking balls, whereby the removable nipple member may be easily uncoupled from the movable block. The lever member comprises a cam operative in a slot in the base plate and a pivot plate operable in a groove in the slidable nipple member. The lower end of the pivot plate is received in an angular slot in a support plate carried on the pivot lever member.

7 Claims, 8 Drawing Figures

HYDRAULIC COUPLER ASSEMBLY

BACKGROUND OF THE INVENTION

1. Field of the Invention

The present invention relates in general to any equipment (e.g., farm implements or the like) which require that a plurality of hydraulic lines be coupled together for transferring a pressurized fluid from a supply source of such fluid to a point of utilization. More particularly, the present invention relates to a hydraulic coupler assembly for use in quickly and easily coupling and uncoupling such hydraulic lines together.

2. Description of the Prior Art

Many agricultural implements, such as plows, harrowers, and the like, have various components or mechanisms which must be operated by hydraulic pressure (i.e., a pressurized fluid). For example, some farm implements have various hydraulic cylinders which lower and raise the implement into and out of engagement with the ground or which cause various tool carrying arms of the implement to extend or retract. It is a customary practice to utilize the hydraulic system of the drive vehicle to which the farm implement is usually attached (e.g., a tractor or the like) as the source of pressurized fluid for the hydraulic cylinders contained on the implement. In this regard, various hydraulic supply lines are provided on both the tractor and the implement. Suitable coupling apparatus must be provided for coupling these lines together in a fluid-tight relationship.

Various hydraulic couplers have been developed for use in coupling hydraulic lines together on both farm implements and on other types of machinery. One coupler of this type is that which is manufactured by Seymour Mfg. Co. of Seymour, Indiana, and which is referred to as a hydraulic coupler assembly, Part No. 18-1608 in the July 1976, Panther III Parts Book, page 103. A coupler of the same general type is also illustrated in U.S. Pat. No. 3,710,823 to Vik.

In the above-noted coupler, a movable body member or block is usually spaced from a fixed body member or block by a spring which tends to move the two bodies apart. The movable body has a longitudinal bore which receives two opposed nipple members. Each nipple member has a ball check valve therein. One of the nipple members (e.g., a "quick-coupler" nipple member) is detachably locked in a fixed position in the movable body by a plurality of locking balls. The locking balls engage an annular groove on the nipple member and are locked therein by a locking surface on the fixed body member. The other nipple member is slidably received inside the movable body and is connected to a cam structure for reciprocating that nipple member inside the body. This cam structure allows the two nipple members to be engaged with one another to open the ball check valves therein and establish fluid flow therethrough. However, when the cam mechanism is activated to separate the nipple members, the ball check valves are closed to interrupt the fluid flow.

One disadvantage of this type of prior art hydraulic coupler has been the difficulty associated with the coupling and uncoupling of the detachable "quick-coupler" nipple members from the movable body. Assuming the hydraulic coupler assembly is in a coupled position, to uncouple the quick-coupler nipple members, the movable body has to be moved against the force of the spring towards the fixed body member until the locking surface on the fixed body allows the locking balls to move radially outwardly, thereby releasing the quick-coupling nipple member. It has previously been necessary to manually force (e.g., by hand) these two body members together to allow the quick-coupler nipple member to be removed. Under field conditions, the coupler assembly often gets jammed and/or coated with dust, grime, crop fragments, and other particulate contaminants. This contamination of the coupler assembly sometimes makes it very difficult to properly move the two body members together to allow uncoupling. Some prior art solutions to this problem comprises dust shields or the like which cover the assembly to keep the contaminating particles out of the operating components of the assembly. However, such shields have not been totally successful in preventing contamination of the coupler assembly. In any event, the need for such shields increases the cost and complexity of the hydraulic coupler assembly.

Even assuming that dust contamination can be prevented from clogging such hydraulic couplers, the spring pressure between the body members usually is sufficiently strong such that some persons (e.g., women, children, and the like) are unable to move the body members together to uncouple the quick-coupler nipple member. In this regard, many farmers customarily utilize their wives and/or their children to help in the work of the farm. A common farming practice, especially when the work that is being performed in the field takes more than one day to complete, is to simply leave the farm implement in the field in the evening while the tractor is returned to the barnyard. If a child is operating the tractor and implement, he is often not strong enough to move the body members on the coupler together to release the coupling lines between the tractor and implement. Thus, he is forced to return both the implement and the tractor to the barnyard and is not able to leave the implement out in the field at the location where the day's work was ended. Thus, when beginning work the next morning or the next time, it is necessary to return the implement to the field and reposition it as necessary to continue the farming operation.

Finally, in uncoupling prior art coupler assemblies, it is necessary to first activate the cam structure to separate the nipple members before attempting to move the body members together to uncouple the hydraulic lines. This interrupts the hydrualic pressure in the lines which somewhat eases the task of forcing the body members together. However, it also requires two separate operations for the farmer. A first operation is necessary to activate the cam structure and the second operation involves the manual pushing of the body members together to finish the job of disconnecting the quick-coupler nipple member. The need for two such separate operations increases the time needed to couple or uncouple the hydraulic coupler assembly.

SUMMARY OF THE INVENTION

It is an aspect of the present invention to provide an improved hydraulic coupler assembly in which means are provided for easily and quickly moving the opposed blocks or body members of the body member together to unlock the quick-coupling nipple members. In addition, it is an aspect of the present invention to provide a hydraulic coupler assembly in which a single pivot lever both reciprocates the nipple members towards and away from one another and also effects the relative movement of the blocks for the purpose of unlocking the quick-coupling nipple members.

An improved hydraulic coupler assembly according to the present invention is embodied in a coupler of the type having a base plate. The base plate mounts a movable body member or block which is opposed to a fixed body member or block. A spring biasing means separates the movable block from the fixed block. In addition, the movable block contains a first nipple member which is slidably held inside the movable block and a second nipple member (e.g., a quick-coupler nipple member) which is detachably locked in the movable block by an appropriate locking means. The present invention comprises a selectively operable pivot lever means which both moves the nipple members towards and away from one another and which also effects relative movement between the blocks. The lever means of the present invention comprises a cam operable in a slot in the base plate. In addition, the lever means comprises a pivot plate member which extends into a groove in the outer surface of each of the first nipple members. A stem of the pivot plate member is received in an angular slot in a support plate which also mounts the cam. The angular slot and cam have two distinct working surfaces which are inversely related to one another. In other words, as the pivot lever is rotated, the slot is effective to first move the nipple members away from one another to shut off hydraulic flow therethrough, and then the cam is operative to move the movable body member towards the fixed body member to unlock the quick-coupler nipple member.

BRIEF DESCRIPTION OF THE DRAWINGS

The present invention will be described hereafter in the Detailed Description, taken in conjunction with the following drawings, in which like reference numerals will refer to like elements throughout.

DETAILED DESCRIPTION

Figure 1:
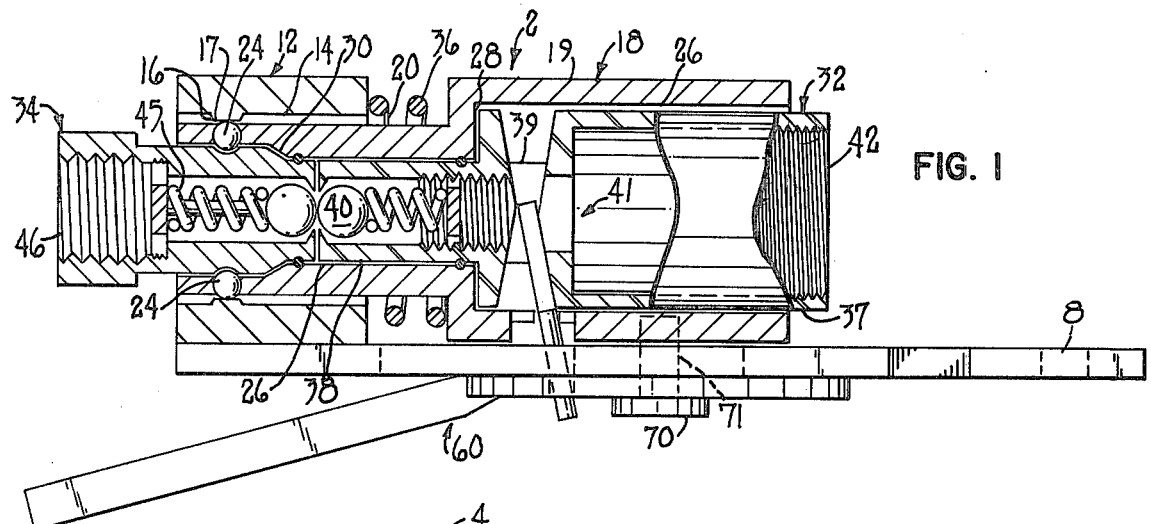
FIG. 1 is a cross-sectional view taken along the cross-sectional lines shown in FIG. 7 of an improved hydraulic coupler assembly according to the present invention, showing a first orientation of the components thereof in which the quick-coupler nipple member is locked in the movable block and hydraulic fluid flow is present through the contacting nipple members.

An improved hydraulic coupler assembly according to the present invetnion is generally indicated as 2 throughout FIGS. 1-7. Coupler assembly 2 is of the same general type as that shown in U.S. Pat. No. 3,710,823 to Vik. It is designed for use in coupling at least one and preferably two pairs or sets of hydraulic lines together (e.g., a set of hydraulic supply lines and a set of return lines). This allows a pressurized motive fluid to be conducted between a supply pump or source of such fluid and a hydraulic cylinder, a hydraulic motor, or the like powered by the fluid. Specifically, hydraulic coupler assembly 2 according to the present invention is meant to be used on farm equipment to couple the hydraulic system of a drive vehicle, such as a tractor, to those farm implements which may be coupled to the tractor and which have components that utilize pressurized fluid as a motive force. However, hydraulic coupler 2 is not limited for use with only farm equipment, but may be used to couple hydraulic lines in any type of equipment having hydraulically powered components.

Referring to FIGS. 2, 4, 6 and 7, hydraulic coupler assembly 2 comprises a generally rectangular base plate 4 which serves as a mounting member. Base plate 4 has an elongated tongue 6 extending from one end thereof. Tongue 6 is provided with a circular bore or opening 8. A flat-headed screw, bolt, or other similar securing member (not shown) passes through opening 8 to suitably attach base plate 4 to the frame work (not shown) of either the drive tractor or the farm implement at a position generally adjacent the hydraulic lines thereon. In addition, base plate 4 has a rectangular opening or slot 10 having two opposed longitudinally extending sides 9 and 11. Slot 10, which will be hereafter referred to as base plate slot 10, is located approximately in the middle of base plate 4. The purpose of base plate slot 10 will be explained in more detail hereafter.

Referring now to FIGS. 1-7, a first block or body member is fixedly attached to one end of base plate 4 adjacent one end of base plate slot 10. Block 12 is fixed to base plate 4 by any suitable attaching means or may be integrally formed with base plate 4. One suitable attaching means comprises a plurality (e.g., two) of socket head screws which pass upwardly through base plate 4 and into engagement with fixed block 12. In addition, fixed block 12 has two substantially cylindrical bores 14 extending therethrough. Each of the bores 14 has an annular locking rib 16 formed on the inner periphery thereof at a selected longitudinal position. Each of the locking ribs 16 radially protrudes inwardly into bore 14 to define a locking surface 17. The purpose of locking rib 16 and locking surface 17 is to cooperate with a plurality of locking balls 24.

A second block or body member 18 is carried by base plate 4. Block 18 is mounted for a reciprocal sliding movement relative to block 12 and will hereafter be referred to as movable block 18, in contrast to fixed block 12. Movable block 18 comprises a main housing 19 having two cylindrical end portions or sleeves 20 extending outwardly from one end thereof. Each of the sleeves 20 has a reduced diameter compared to the height of housing 19 and extends inwardly into one of the bores 14 in fixed block 12. In this regard, the diameter of each sleeve 20 is less than the diameter of bore 14. Since each of the sleeves 20 extends into bore 14, these sleeves define a first or male end on movable block 18. Similarly, the ends of housing 19 which are opposite to sleeves 20 define a second or female end to movable block 18. Thus, the opposed ends of block 18 are defined respectively by housing 19 and sleeves 20. Furthermore, each of the sleeves 20 has a plurality of circumferentially spaced steel locking balls 24 placed in suitable openings or holes therein. Locking balls 24 coact with locking rib 16 to be radially moved inwardly relative to sleeves 20 for a purpose to be described hereafter.

Movable body 18 contains two elongated bores 26 therein which extend through the housing portion 19 of body 18 and through each of the sleeves 20 respectively. Each bore 26 is identical and therefore a description of one will suffice to describe the other. Bore 26 has a first annular radial shoulder 28 formed by the inner end wall of housing 19. Bore 26 also includes a second annular radial shoulder 30 formed on the inner periphery of sleeve 20. Two compression springs 36 are placed between fixed block 12 and movable block 18 with one spring 36 being received around each sleeve 20. Springs 36 tend to force the blocks 12 and 18 apart to a position in which the annular locking rib 16 is longitudinally aligned with the locking balls 24, as shown in FIG. 1.

First and second nipple members 32 and 34 are respectively received in the bore 26 and extend through the opposed ends of movable block 18. Nipple member 32 is slidably received in bore 26 for longitudinal movement toward and away from nipple member 34 which is detachably locked by locking balls 24 in sleeve 20. Referring now to FIGS. 1-6, one half of the coupler assembly 2 is illustrated therein showing only one pair or set of nipple members 32 and 34. The other set of nipple members 32 and 34 in the other bore 26 is identical to the structure and operation of the first set described herein. Both of the nipple members 32 and 34 are similar to the opposed nipple members shown in the above-mentioned patent to Vik. This patent is hereby incorporated by reference insofar as is necessary for an understanding of the components of nipple member 32 and 34.

Nipple member 32 comprises a generally cylindrical body portion 37 having an outwardly projecting cylindrical stem 38 on one end thereof. The inner end of body portion 36 abuts against shoulder 30 in the movable block 18 in one position of the nipple member 32. Stem 38 extends at least partially into sleeve 20 in an opposed relationship to nipple member 34. A conventional ball check valve 40 is threadedly mounted in stem 38. In addition, nipple member 32 has a longitudinally extending bore 41 which extends through the entire length of the nipple member. The outer end 42 of the bore 41 is internally threaded to suitably receive an externally threaded end or connector (not shown) of a first hydraulic supply line (e.g., a hydraulic supply line on a drive vehicle).

The second nipple member 34 is generally of the type known as a "quick-coupler" nipple member. Nipple member 34 comprises an elongated cylindrical body 44 having a bore passing therethrough 45 and a threaded outer end 46. Outer end 46 threadedly receives the threaded connector (not shown) of a second hydraulic supply line (e.g., a hydraulic supply line on a farm implement) which is to be coupled to the first hydraulic supply line connected to nipple member 32. In addition, nipple member 34 includes a ball check valve 48 which is opposed to the ball check valve 40 in nipple member 32. In addition, the exterior surface of nipple member 32 has an annular locking groove 50 for receiving locking balls 24.

A pivot lever means or member, generally indicated as 60, is provided for exerting a mechanical advantage on both nipple member 32 and movable block 18. This mechanical advantage allows an operator to reciprocate or slide nipple member 32 toward and away from nipple member 34 to establish or interrupt hydraulic fluid flow through the nipple members. In addition, this mechanical advantage allows the operator to easily move movable block 18 towards fixed block 12 against the bias of spring 36 to allow nipple member 34 to be removed from block 18 to uncouple the hydraulic supply line. Thus, the single pivot lever means 60 allows the coupled hydraulic supply lines to be quickly and easily uncoupled, and vise-versa.

Pivot lever means 60 comprises a circular support plate 62 having an attached lever or handle 64 which extends at an oblique angle to plate 62. A curved cam 66 is integrally formed with or fixedly attached to one surface of plate 62. An arcuate or angular slot 68 is located in the surface of plate 62 generally adjacent cam 66. In addition, a pivot pin 70, such as a tap screw, passes upwardly through the center of support plate 62 and the cam 66 to be received in movable block 18. Support plate 62 is pivotably journaled about a smooth shank 71 of pivot pin 70 to pivotably attach the pivot lever means 60 to movable block 18.

Figure 2:
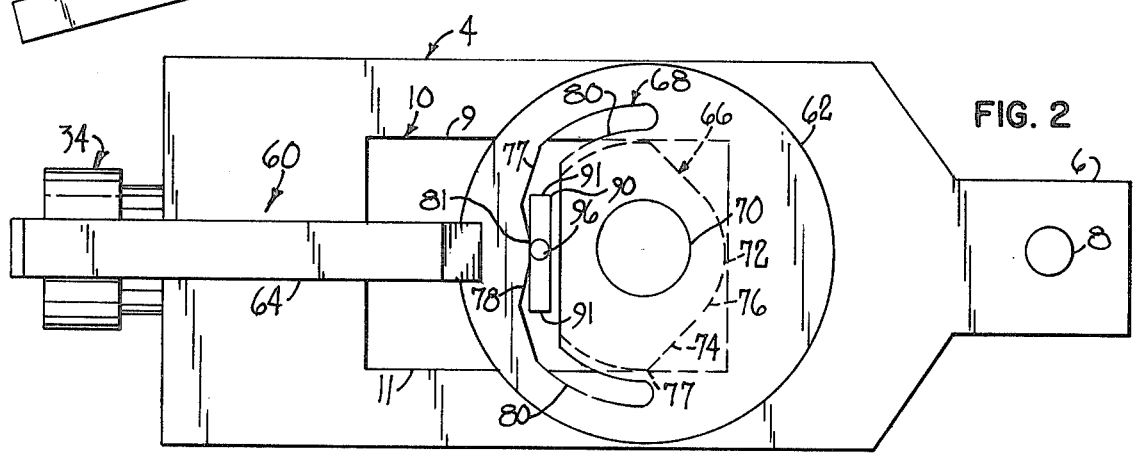
FIG. 2 is a bottom plan view of the hydraulic coupler assembly in the orientation shown in FIG. 1.
Figure 4:
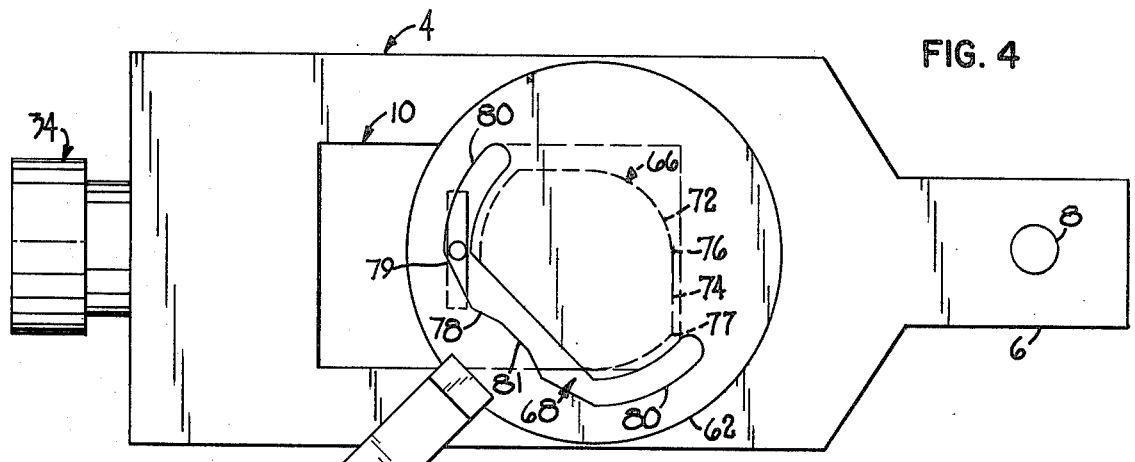
FIG. 4 is a bottom plan view of the hydraulic coupler assembly in the orientation shown in FIG. 3.
Figure 6:
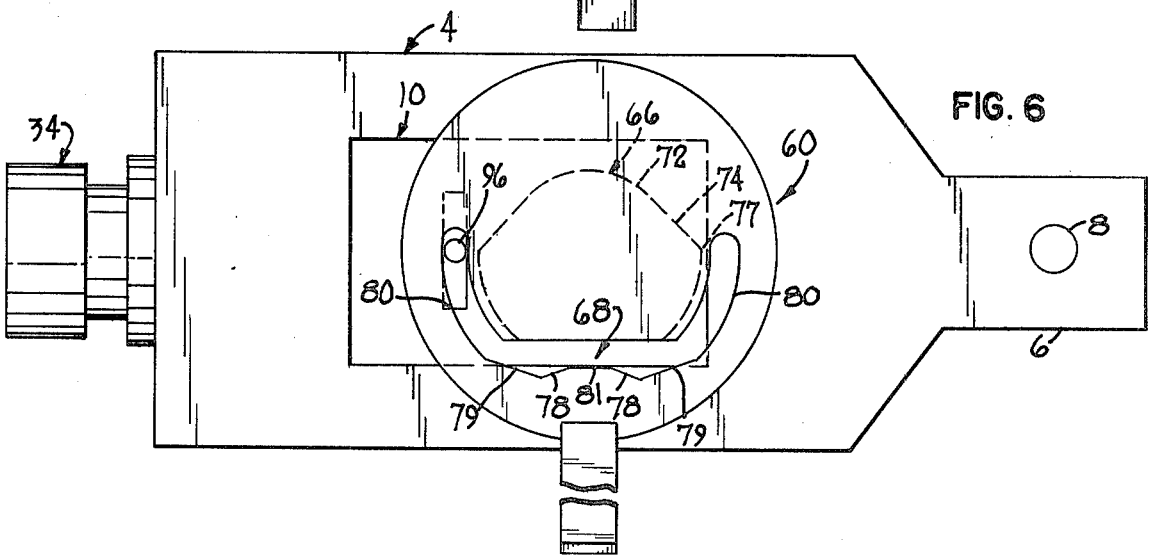
FIG. 6 is a bottom plan view of the hydraulic coupler assembly in the orientation shown in FIG. 5.

As shown in FIGS. 2, 4, and 6, when pivot pin 70 attaches the pivot lever means 60 to the movable block 18, cam 66 is received inside base plate slot 10. Cam 66 has first and second working surfaces 72 and 74 thereon. First working surface 72 is an arcuate surface of substantially constant diameter from the axis of the pivot pin 70. Second working surface 74 is also an arcuate surface but is of generally radially increasing diameter from the axis of pivot pin 70. The junction of the two surfaces 72 and 74 is located at a point 76. In addition, cam 66 has two opposed points 77 which engage the sides 9 and 11 of base plate slot 10 when the handle 64 is in a normal orientation (i.e., a 0° orientation, FIG. 2). Similarly, angular slot 68 has a first flat surface 81 provided with first and second working surfaces 78 and 80 connected by a straight line transition section or surface 79. Working surface 78 is of generally radially increasing diameter of distance relative to the axis of pivot pin 70. Working surface 80 is of generally constant diameter with regard to the axis of pivot pin 70.

Figure 7:
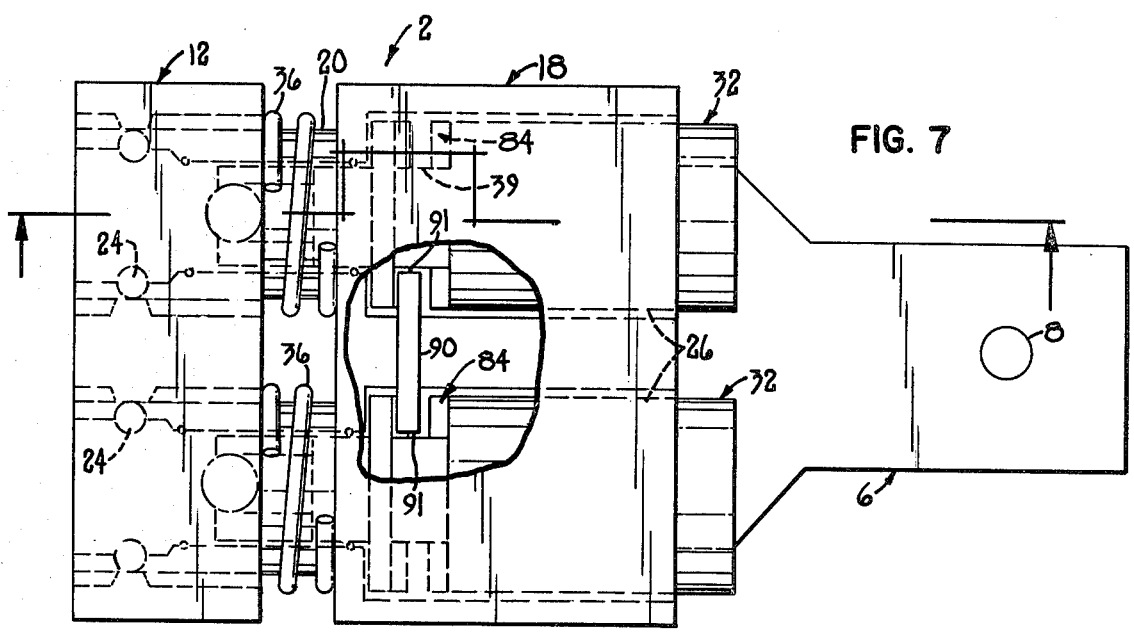
FIG. 7 is a top plan view of the hydraulic coupling assembly according to the present invention.
Figure 8:
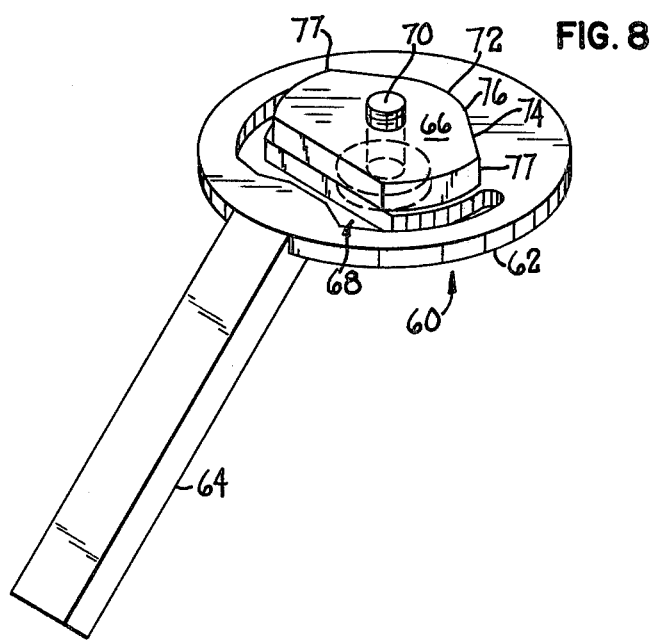
FIG. 8 is a perspective view of the pivot lever means utilized in the hydraulic coupler assembly of the present invention.

Each of the slidable or movable nipple members 32 are provided with opposed angularly shaped grooves or channels 84 in the exterior surface thereof. Each of the grooves 84 are V-shaped having opposed slanted sides 86 and 88 which cut through the body 37 of the nipple member 32. However, grooves 84 do not penetrate into bore 41 but surround a substantially cylindrical reduced portion 39 of body 37. A substantially rectangular pivot plate member 90 is received as shown in FIG. 7 between the grooves 84 of the transversely spaced nipple members 32. The opposed sides 91 of pivot plate 90 bear on the inner sides of the grooves 84. The lower end of rectangular pivot plate 90 has a circular stem 96 which passes downwardly through an opening 92 in the bottom wall of the block 18. Stem 96 is suitably received in the slot 68 of support plate 62.

Referring now to FIGS. 1-6, the operation of hydraulic coupler assembly 2 according to the present invention will be described herein. FIGS. 1 and 2 correspond to the orientation of the coupling assembly when it is configured for fluid flow therethrough. In this regard, the first nipple member 32 is received inside the movable block 18 in a forward position such that is coacts with the second nipple member 34 which is suitably locked in place in block 18 by locking balls 24. Locking balls 24 are opposed by the annular locking rib 16 on fixed block 12 and are cammed radially inwardly to engage locking groove 50. In the orientation of FIG. 1, the balls of the ball check valves 40 and 48 in each of the nipple members engage one another to push one another off their respective valve seats. This allows hydraulic fluid to flow through the coupled nipple members 32 and 34. Pivot lever means 60 is disposed with handle 64 arranged at a substantially 0° position relative to tongue 6 of base plate 4. Stem 96 of pivot plate 90 is received in the slot 68 and the cam 66 engages in base plate slot 10 with the opposed points 77 engaging the opposed sides 9 and 11 of slot 10.

Figure 3:
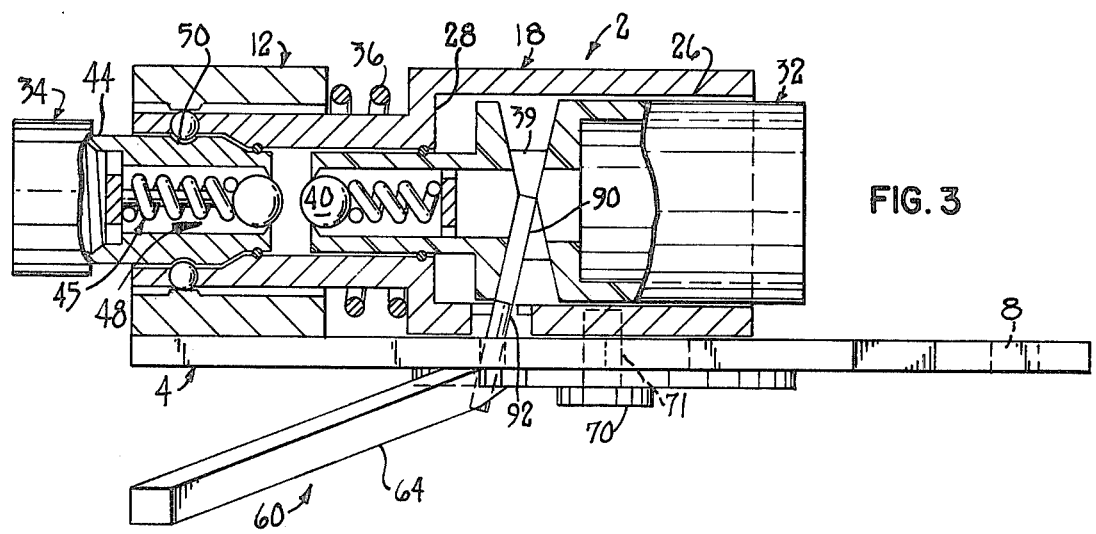
FIG. 3 is a cross-sectional view taken along the cross-sectional lines shown in FIG. 7 of an improved hydraulic assembly according to the present invention, showing the components thereof in a second orientation in which the quick-coupler nipple member is locked to the movable block and the nipple members have been separated to interrupt the hydraulic fluid flow therethrough.

At some point in the operation of the equipment which carries coupler assembly 2, it is desired to uncouple the coupler assembly 2 by removing the nipple members 34 from movable block 18. When coupler assembly 2 is mounted on farm equipment, this uncoupling allows the drive tractor to be driven away from the farm implement. To uncouple nipple members 34, handle 64 is first rotated through approximately 45° to a position as shown in FIGS. 3 and 4. As handle 64 is rotated, the stem 96 of pivot plate 90 engages or is cammed by the increasing diameter surface 78 of the angular slot 68, as shown in FIG. 4. This camming action on the pivot plate 90 causes the pivot plate 90 to swing from the orientation shown in FIG. 1 to that shown in FIG. 3, i.e., from engagement with one slanted side 88 of groove 84 to engagement with the other slanted side 86. This pivoting movement of the pivot plate 90 moves the nipple members 32 rearwardly inside the block 18. Block 18 remains stationary relative to the fixed block 12 during the movement of nipple members 32. The rearward movement of nipple members 32 separates the previously coupled nipple members 32 and 34 as shown in FIG. 3. As soon as the balls of the nipple members no longer contact one another, the ball check valves 40 and 48 automatically close against their valve seats, thereby shutting off the flow of hydraulic fluid through the nipple members 32 and 34. During the pivoting movement of the pivot plate member 90 through 45°, only the constant diameter surface 92 of cam 66 has been in engagement with base plate slot 10. Therefore, the longitudinal location of the axis of pivot pin 70 remains the same and the position of movable block 18 relative to the fixed block 12 is unchanged.

Figure 5:
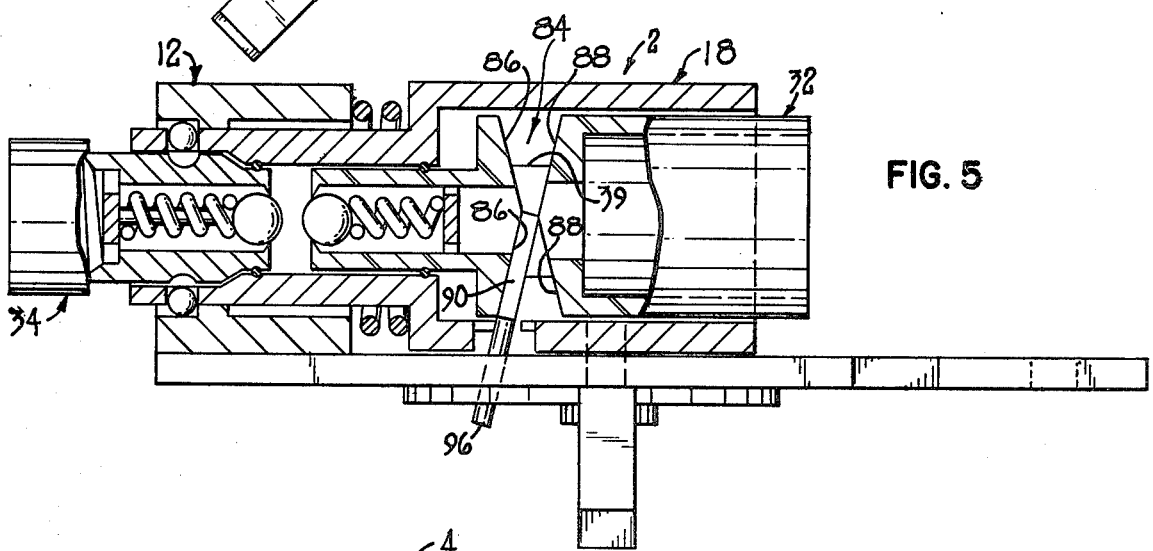
FIG. 5 is a cross-sectional view taken along the cross-sectional lines shown in FIG. 7 of a coupler according to the present invention, showing the components thereof in a third orientation in which the quick-coupler nipple member has been unlocked from the movable body and with the nipple members thereof being separated such that the hydraulic fluid flow therethrough is interrupted.

Referring now to FIGS. 5 and 6, the hydraulic fluid pressure through the coupler assembly 2 has been shut off after 45° of rotation of handle 14. To unlock the coupling nipple members 34 from movable block 18, handle 64 is rotated from 45°-90°. In this regard, the stem 96 of the pivot plate member enters the constant diameter surface 80 of the slot 68. Thus, no further pivoting movement of the pivot plate member 90 relative to the movable block 18 is achieved. In other words, the nipple members 32 and 34 will remain stationary relative to the movable block 18. However, the increasing diameter surface 74 of the cam 66 is now engaged with and works in the base plate slot 10. This engagement cams the movable block 18 forwardly relative to the fixed block 12. This forward movement of block 18 projects the sleeves 20 forwardly through the bores 14 in the fixed block 12 until the locking balls 24 are no longer engaged by the annular locking ribs 16. Thus, the locking balls 24 may be moved radially outwardly as shown in FIG. 5 from the locking groove 50 of the nipple member 34. This unlocking allows the nipple members 34 to be quickly and easily uncoupled from movable block 18.

Coupler assembly 2 according to the present invention may be easily and quickly coupled and/or uncoupled because of the mechanical advantage given by the pivot lever means 60. In order to uncouple the nipple members 34 from the coupler 2, all that is required is that the pivot lever means be rotated from 0°-90°. Blocks 12 and 18 no longer have to be manually forced together. Because of the ease with which the rotation of pivot lever means 60 can be accomplished, even a small child or the like can uncouple the hydraulic coupler assembly 2. In addition, the mechanical advantage provided by the pivot lever means 60 allows easy uncoupling even under field conditions where coupler assembly 2 is susceptible to dust contamination and the like.

The present invention is also advantageous since only a single pivot lever means 60 is needed to reciprocate or operate both the nipple members 32 and the movable block 18. Thus, the prior art arrangement of utilizing a separate cam means for the nipple members 32 is obviated. Since only one pivot lever means 60 is now needed, the coupler assembly 2 will require less material and be somewhat less expensive to manufacture or purchase than prior art couplers. Moreover, the use of a single pivot lever means 60 allows the nipple members 34 to be uncoupled in one continuous operation. It is no longer necessary to have a totally separate camming operation to uncouple the nipple members 32 and 34 as that is now accomplished in the first 45° of rotation of handle 64.

Although the uncoupling operation for coupler 2 has been described in conjunction with FIGS. 1–6, coupler assembly 2 is also effective for coupling the nipple members 32 and 34 together. To couple the nipple members 32 and 34 together, the apparatus is first placed into its orientation as shown in FIG. 5 in which the nipple members 34 may be freely inserted into the movable block 18. The handle is then rotated from its 90° to its 0° position to first lock the nipple members 34 in place and to then automatically hook up and connect the nipple members 32 and 34 together to allow hydraulic fluid to flow therethrough. Thus, the coupling procedure is substantially the reverse of the uncoupling procedure as described previously.

Various modifications of the present invention will be apparent to those skilled in the art. For example, although it is preferred that a single pivot lever means 60 be provided for operating both the nipple members 32 and the movable block 18, the arrangement of the prior art in which separate levers are used to actuate the nipple members 32 could be utilized. In this event, the pivot plate member 90 and the angular slot 68 will be deleted from the pivot lever means 60 and the shape of the cam 66 will be changed so that any rotation of the handle 64 will cause movement of the block 18 forwardly to unlock nipple members 34. In addition, it is not necessary that the dual hydraulic line arrangement (e.g., two pairs of opposed lines) as shown in FIG. 7 be utilized. Instead, only one half of the coupling apparatus shown there could be used with only one nipple member 32 and one nipple member 34. The pivot lever means 60 of the present invention can be applied to this structure to cause movement of the nipple member 32 in the movable block 18 as described above. Therefore, the scope of the present invention is to be limited only by the appended claims.

What is claimed is:

1. An improved hydraulic coupler assembly of the type having a base plate; a fixed block and a movable block carried on the base plate for longitudinal movement relative to one another, the movable block having opposed male and female ends with the male end thereof being received inside the fixed block; means for biasing the fixed and movable blocks away from one another; first and second nipple members received respectively inside the male and female ends of the movable block, the first and second nipple members being connected respectively to first and second hydraulic lines; the movable block having locking means cooperable with a locking surface on the fixed block for locking the first nipple member in a fixed position in the male end of the movable block; and wherein the improvement comprises:
    (a) an elongated slot located in the base plate; and
    (b) a lever pivotably connected to the movable block by a pivot pin on which the lever is rotatably journaled, the lever including a cam carried therewith which cam is operatively located in the base plate slot, the cam being configured such that rotation of the lever about the pivot pin causes the cam to act inside the base plate slot to move the movable block through the pivot pin toward and away from the fixed block to respectively unlock and lock the locking means for the first nipple member, a support plate carried on the lever, wherein the support plate mounts the cam and covers that portion of the base plate slot in which the cam is operative to protect the cam fron contamination by foreign materials, whereby the first nipple member may be easily disconnected from or connected to the male end of the movable block.

2. An improved hydraulic coupler assembly as recited in claim 1, in which the pivotable lever further includes means for reciprocating the second nipple member towards and away from the first nipple member, the first and second nipple members having ball check valves which are opened when the nipple members contact each other to establish hydraulic flow through the hydraulic lines.

3. An improved hydraulic coupler assembly as recited in claim 1, in which the movable block has at least a pair of first nipple members which are respectively aligned with a pair of second nipple members, the pivot lever being received between the nipple members such that opposed sides of the pivot plate engage in the grooves in the second nipple members.

4. An improved hydraulic coupler assembly of the type having a base plate; a fixed block and a movable block carried on the base plate for longitudinal movement relative to one another, the movable block having opposed male and female ends with the male end thereof being received inside the fixed block; means for biasing the fixed and movable blocks away from one another; first and second nipple members received respectively inside the male and female ends of the movable block, the first and second nipple members being connected respectively to first and second hydraulic lines; the movable block having locking means cooperable with a locking surface on the fixed block for locking the first nipple member in a fixed position in the male end of the movable block; and wherein the improvement comprises:
    (a) an elongated slot located in the base plate; and
    (b) a lever pivotably connected to the movable block by a pivot pin on which the lever is rotatably journaled, the lever including a cam carried therewith which cam is operatively located in the base plate slot, the cam being configured such that rotation of the lever about the pivot pin causes the cam to act inside the base plate slot to move the movable block through the pivot pin toward and away from the fixed block to respectively unlock and lock the locking means for the first nipple member, whereby the first nipple member may be easily disconnected from or connected to the male end of the movable block; and
    (c) wherein the pivotable lever further includes means for reciprocating the second nipple member towards and away from the first nipple member, the first and second nipple members having ball check valves which are opened when the nipple members contact each other to establish hydraulic flow through the hydraulic lines, and in which the second nipple member reciprocating means comprises:
        (i) a pivotal plate received in a groove in the second nipple member; the pivotal plate extending downwardly through an opening in the movable block so as to be pivotal relative to the movable block in opposed directions to reciprocate the second nipple member, and wherein the pivotal plate further includes an actuating stem thereon; and
        (ii) a support plate carried on the lever, wherein the support plate mounts the cam and further includes an angularly shaped slot which operatively receives the stem on the pivotal plate, the support plate slot and the cam being shaped relative to one another such that the support plate slot is effective to pivot the pivotal plate before the cam is effective to move the movable block during rotation of the lever from a first to a second position, and vice versa during rotation of the lever from the second position back to the first position.

5. A improved hydraulic coupler assembly as recited in claim 4, in which both the support plate slot and the cam have first and second working surfaces which are operable during rotation of the lever from one of its positions to the other; wherein the first working surface of the cam defines a constant radius surface relative to the pivot pin of the lever and the first working surface of the support plate slot defines a variable radius surface with respect to the pivot pin of the lever, whereby rotation of the lever over an arc corresponding to the first working surfaces causes the support plate slot to rotate the pivot plate in the groove on the second nipple member to effect movement thereof while the cam is not effective to move the movable block, and wherein the second working surface of the cam is a variable radius surface relative to the pivot pin while the second working surface of the support plate slot is a constant radius surface relative to the pivot pin, whereby rotation of the lever over an arc corresponding to the location of the second working surfaces causes the cam to operate in the base plate slot to effect movement of the movable block relative to the fixed block while no movement of the second nipple member is effected by the support plate slot.

6. An improved hydraulic coupler assembly as recited in claim 5, in which the first position of the lever corresponds to a zero degree position of lever rotation and the second position of the lever corresponds to a 90° position of lever rotation, and in which the junction between the first and second working surfaces of the slot and the cam is at approximately 45° of lever rotation.

7. An improved hydraulic coupler assembly of the type having a base plate; a fixed block and a movable block carried on the base plate for longitudinal movement relative to one another, the movable block having opposed male and female ends with the male end thereof being received inside the fixed block; means for biasing the fixed and movable blocks away from one another; first and second nipple members received respectively inside the male and female ends of the movable block, the first and second nipple members being connected respectively to first and second hydraulic lines; the movable block having locking means cooperable with a locking surface on the fixed block for locking the first nipple member in a fixed position in the male end of the movable block; and wherein the improvement comprises:

(a) an elongated slot located in the base plate; and
(b) lever means for exerting a mechanical advantage on the movable block to move the movable block towards and away from the fixed block to respectively unlock and lock the locking means for the first nipple member, whereby the first nipple member may be easily disconnected from or connected to the male end of the movable block, wherein the lever means comprises:
  (i) a pivot pin secured to the movable block and extending outwardly through the base plate slot;
  (ii) a support plate which includes a cam rotatably mounted around the pivot pin and having a working surface located in the base plate slot, wherein the working surface is configured such that rotation of the cam around the pivot pin causes the pivot pin to move relative to the base plate to move the movable block towards or away from the fixed block, wherein the support plate mounts the cam and covers that portion of the base plate slot in which the cam is operative to protect the cam from contamination by foreign materials; and
  (iii) handle means secured to the support plate for exerting a mechanical advantage on the cam to rotate the cam inside the base plate slot.

* * * * *